(12) United States Patent
Kim et al.

(10) Patent No.: US 7,447,178 B2
(45) Date of Patent: Nov. 4, 2008

(54) WIRELESS PERSONAL AREA NETWORK, COORDINATOR THEREOF, AND COORDINATOR SELECTION METHOD FOR HAND-OVER THEREOF

(75) Inventors: Sung-Hee Kim, Daejeon (KR); Heon-Ju Jeong, Daejeon (KR); Moo-Ho Cho, Kyungjo (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 481 days.

(21) Appl. No.: 11/027,803

(22) Filed: Dec. 29, 2004

(65) Prior Publication Data

US 2005/0237979 A1    Oct. 27, 2005

(30) Foreign Application Priority Data

Apr. 21, 2004    (KR) .................... 10-2004-0027472

(51) Int. Cl.
   *H04Q 7/00* (2006.01)
(52) U.S. Cl. .................. 370/331; 370/401; 370/332; 370/333; 370/400; 455/436; 455/439; 455/41.2; 709/205
(58) Field of Classification Search ............ 370/331, 370/332, 333, 400, 401; 455/436, 439, 41.2, 455/433, 413; 707/201, 202, 7, 8
See application file for complete search history.

(56) References Cited

U.S. PATENT DOCUMENTS

| 6,377,805 | B1* | 4/2002 | Anvekar et al. ............. 455/436 |
| 7,002,938 | B2* | 2/2006 | Hester et al. ................ 370/330 |
| 7,158,758 | B2* | 1/2007 | Lim et al. .................... 455/41.3 |
| 2001/0012757 | A1* | 8/2001 | Boyle ......................... 455/11.1 |
| 2003/0036350 | A1* | 2/2003 | Jonsson et al. ............... 455/41 |
| 2005/0059420 | A1* | 3/2005 | Salokannel et al. ......... 455/522 |
| 2005/0130656 | A1* | 6/2005 | Chen .......................... 455/436 |

FOREIGN PATENT DOCUMENTS

| KR | 10-2002-0047204 A | 6/2002 |
| KR | 2003-0003988 | 1/2003 |
| KR | 10-0408046 B | 12/2003 |
| KR | 10-0420916 B | 3/2004 |

OTHER PUBLICATIONS

-"Configuration Inquiry Process" S. Sugaya et al., IEEE.802.15-01/499rl, Oct. 2001.

* cited by examiner

*Primary Examiner*—Rafael Pérez-Gutiérrez
*Assistant Examiner*—Nimesh Patel
(74) *Attorney, Agent, or Firm*—Blakely, Sokoloff, Taylor & Zafman LLP

(57) ABSTRACT

The coordinator broadcasts a candidate inquiry request command while having a list of candidate coordinators performing a coordinator role. The candidate coordinators receive the candidate inquiry request command, one of the candidate coordinators broadcasts a candidate notifying command, and other candidate coordinators check whether the candidate notifying command has been received. Devices check whether the candidate notifying command has been received from the candidate coordinator, and broadcast a candidate inquiry information command including the candidate notifying command receipt information. The candidate coordinator checks whether the candidate inquiry information command has been received, and broadcasts a candidate inquiry response command including number of accessible devices and the candidate notifying command receipt information. The coordinator receives the candidate inquiry response command and estimates communication performance ranks for the respective candidate coordinators.

10 Claims, 3 Drawing Sheets

WIRELESS PERSONAL AREA NETWORK, COORDINATOR THEREOF, AND COORDINATOR SELECTION METHOD FOR HAND-OVER THEREOF

CROSS REFERENCE TO RELATED APPLICATION

This application claims priority to and the benefit of Korea Patent Application No. 10-2004-27472 filed on Apr. 21, 2004 in the Korean Intellectual Property Office, the entire content of which is incorporated herein by reference.

BACKGROUND OF THE INVENTION (a) Field of the Invention

The present invention relates to a wireless personal area network, a coordinator thereof, and a coordinator selection method for hand-over thereof. More specifically, the present invention relates to a wireless personal network in which a candidate device for performing as a coordinator participates in a communication performance test, a coordinator thereof, and a coordinator selection method for handover of the coordinator.

(b) Description of the Related Art

A wireless personal area network, specifically a piconet, is a collection of devices using the same physical channel for interchanging information. When a piconet is formed, one device acts as the master, which is called a piconet coordinator, for generating a beacon and managing the network, and common devices for interchanging information under control of the piconet coordinator act under the control of the piconet coordinator.

Coordinator hand-over is performed when a new device for performing a role as the coordinator participates in the network, and the new device performs better than the coordinator that is currently used. The role as the coordinator is transferred to a device having a best performance by comparing functions of devices in the network when the coordinator currently used leaves the network or stops operating. At this time, selecting a coordinator by comparing the functions of devices in the network is called coordinator selection.

A coordinator has been conventionally selected by simply comparing information on functions (e.g. transmission power and maximum number of devices that are able to be controlled) of devices. A device may not perform as a coordinator even though the function of the device is great because the communication performance between the devices is not considered when the coordinator is selected when simply comparing the functions of the devices. Accordingly, a configuration inquiry method is used to solve the above problem. In the method, communication performance between the devices is considered.

The configuration inquiry process comprises: a first step in which the coordinator broadcasts a configuration inquiry (CI) request command, and the device having received the CI request command broadcasts a CI response command in order to inquire of the communication performance, and other devices receive the CI response command and store a transmission device ID in an accessible device list; a second step in which each device broadcasts the information on the accessible device list included in the CI response command to the coordinator in order to inform the accessible device list, and the coordinator that receives the command stores the information; and a third step in which the coordinator broadcasts a CI terminate command to stop the CI process with devices in the network.

The CI process has problems as follows.

First, the test for the communication performance among devices is performed in one direction, because the communication performance is inquired by transmitting the CI response command in the second step. Therefore an accessible state may be determined when communication between devices is not performed.

Second, a coordinator selection process is performed when a coordinator hand-over is performed, and therefore it is difficult to immediately transfer a coordinator role when it is urgent.

Third, messages for a communication performance test may be excessively generated because all devices participate in the test.

SUMMARY OF THE INVENTION

It is an advantage of the present invention to provide a wireless personal area network in which a candidate coordinator for a coordinator hand-over participates in a communication performance test, a coordinator thereof, and a coordinator selection method for hand-over thereof. It is also an advantage of the present invention to provide a wireless personal area network in which communication performance between devices is checked in both directions and a candidate for the coordinator hand-over is preliminarily selected and maintained, a coordinator thereof, and a coordinator selection method for hand-over thereof.

The present invention discloses a coordinator. The coordinator includes a candidate coordinator list having information on more than one candidate coordinator for performing a role as a coordinator in a wireless personal area network, and it broadcasts a candidate inquiry request command having the candidate coordinator list information.

The present invention also discloses a wireless personal area network including a coordinator. In the wireless personal area network, the coordinator includes a candidate coordinator list having information on the candidate coordinator, and it broadcasts a candidate inquiry request command having the information on the list of the candidate coordinator. The candidate coordinator receives the candidate inquiry request command and sequentially broadcasts a candidate notifying command, and other candidate coordinators and a common device check whether the candidate notifying command has been received from the candidate coordinator on broadcasting.

The common device checks whether the candidate notifying command has been received and sequentially broadcasts a candidate inquiry information command having the information on whether the candidate notifying command has been received, and the candidate coordinator checks whether the candidate inquiry information command has been received from the device having received the candidate notifying command broadcasted by the candidate coordinator, and sequentially broadcasts a candidate inquiry response command having the candidate notifying command receipt information and the number of accessible devices.

The coordinator checks the number of transmission devices of the received candidate inquiry information command, and estimates the communication performance of the coordinator. Also, the coordinator receives the candidate inquiry response command, and estimates communication performance ranks for the respective candidate coordinators.

The coordinator receives the candidate inquiry response command, estimates the communication performance ranks for the respective candidate coordinators, and transfers a role as a coordinator to a first rank candidate coordinator when the communication performance of the first rank candidate coordinator is superior to that of the coordinator.

The coordinator receives the candidate inquiry response command, estimates the communication performance ranks for the respective candidate coordinators, and stores the first candidate coordinator as a candidate coordinator when the communication performance of the coordinator is superior to that of the first candidate coordinator.

At this time, the communication performance estimation for the respective candidate coordinators depends on the number of the checked accessible devices.

The present invention also discloses a method for selecting a coordinator for a coordinator hand-over in a wireless personal area network. In the method, the coordinator broadcasts a candidate inquiry request command having a list of candidate coordinators for performing a role as the coordinator; the candidate coordinators receive the candidate inquiry request command, one of the candidate coordinators sequentially broadcasts a candidate notifying command, and other candidate coordinators check whether the candidate notifying command has been received; a common device in the wireless personal area network checks whether the candidate notifying command has been received from the candidate coordinator, and sequentially broadcasts a candidate inquiry information command including the candidate notifying command receipt information; the candidate coordinator checks whether the candidate inquiry information command has been received from the device having received the candidate notifying command broadcasted by the candidate coordinator, and sequentially broadcasts a candidate inquiry response command including the candidate notifying command receipt information and the number of accessible devices; and the coordinator receives the candidate inquiry response command, and estimates communication performance ranks for the respective candidate coordinators.

At this time, the device sequentially broadcasts the candidate inquiry information command, and the coordinator checks the number of transmission devices of the received candidate inquiry information command and estimates the communication performance ranks for the respective candidate coordinators; and the coordinator estimates the communication performance ranks for the respective candidate coordinators, and transfers a role as a coordinator to a first rank candidate coordinator when the communication performance of the first rank candidate coordinator is superior to that of the coordinator.

The coordinator stores the first rank candidate coordinator as a candidate coordinator when the communication performance of the coordinator is superior to that of the first rank candidate coordinator.

At this time, the communication performance estimation for the respective candidate coordinators depends on the number of accessible devices checked.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Figure 1:
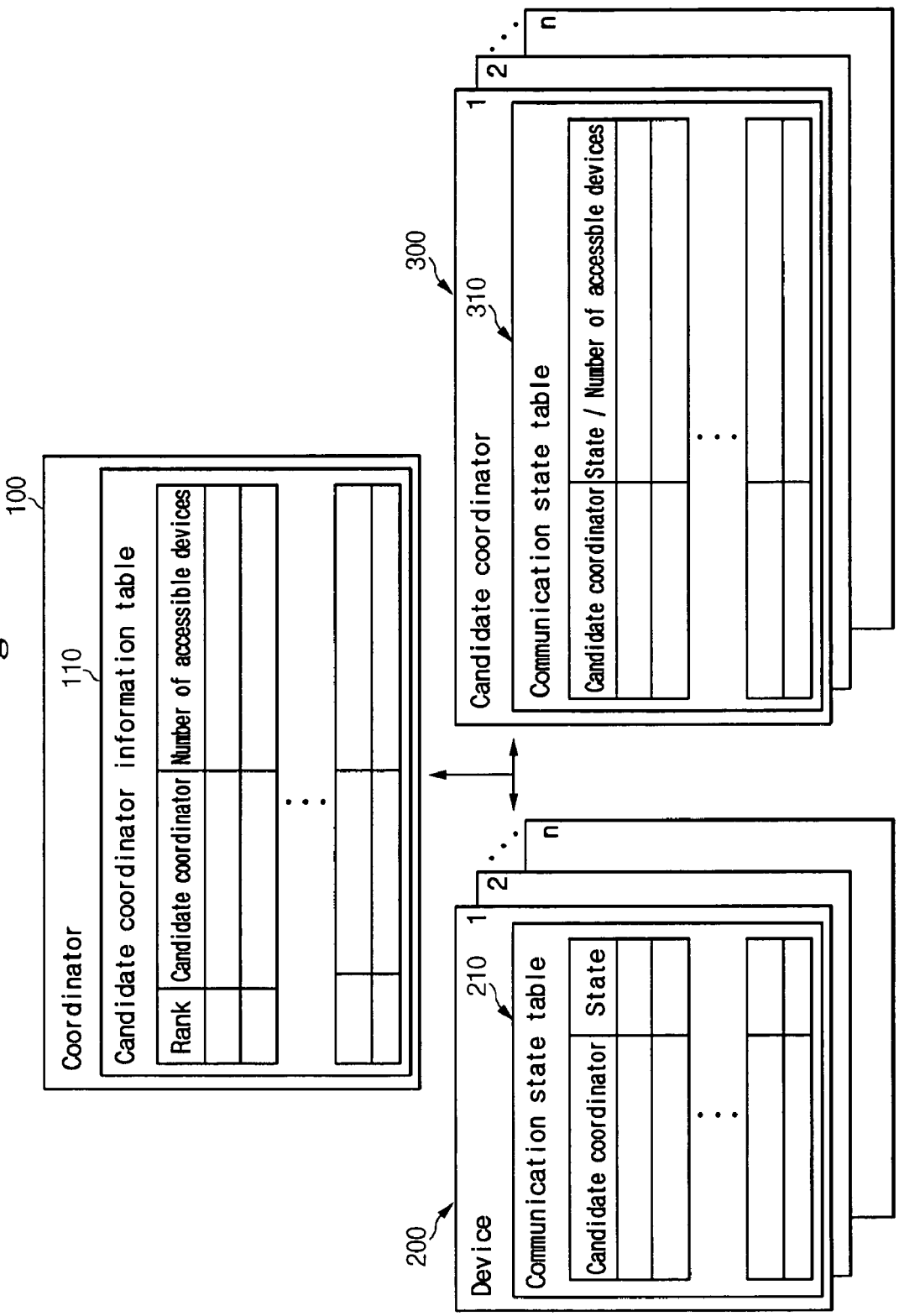
FIG. 1 shows a configuration of a wireless personal area network according to a first exemplary embodiment of the present invention.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

Exemplary embodiments of the present invention will now be described in detail with reference to the annexed drawings.

As shown in FIG. 1, a wireless personal area network according to an exemplary embodiment of the present invention has a coordinator 100, a candidate coordinator 300 for functioning as the coordinator, and a device 200.

The coordinator 100 includes a candidate coordinator information table 110 for storing information on the candidate coordinator 300. Individual identification (ID) of the candidate coordinators 300, the number of accessible devices for each candidate coordinator 300, and ranking fields according to the number are provided in the candidate coordinator information table 110. The coordinator 100 further includes a table for information on the number of accessible devices for the coordinator 100, and the table is re-formed to include a newly participating device when the coordinator 100 starts a coordinator selection process for a coordinator hand-over.

The device 200 includes a communication state table 210 for storing information on a communication state between the device 200 and the candidate coordinator 300. The communication state table 210 is formed when the device 200 receives a candidate inquiry request command broadcasted by the coordinator 100, and includes the individual IDs of the candidate coordinators 300 and state fields for representing the communication states between the device 200 and the candidate coordinator 300. For example, 0 is represented as an inaccessible state, and 1 is represented as an accessible state in the state fields.

The candidate coordinator 300 includes a communication state table 310. The communication state table 310 is formed when the candidate coordinator 300 receives the candidate inquiry request command broadcasted by the coordinator 100, and includes the individual IDs of the candidate coordinators 300 and state fields for representing the communication states between the device 200 and the candidate coordinator 300. At this time, a communication state (e.g. accessible state: 1; inaccessible state: 0) between the candidate coordinator 300 and another candidate coordinator 300 is represented in a communication field corresponding to the ID of the other candidate coordinator 300, and the number of accessible devices is represented in a state field corresponding to the ID of the candidate coordinator.

Figure 2:
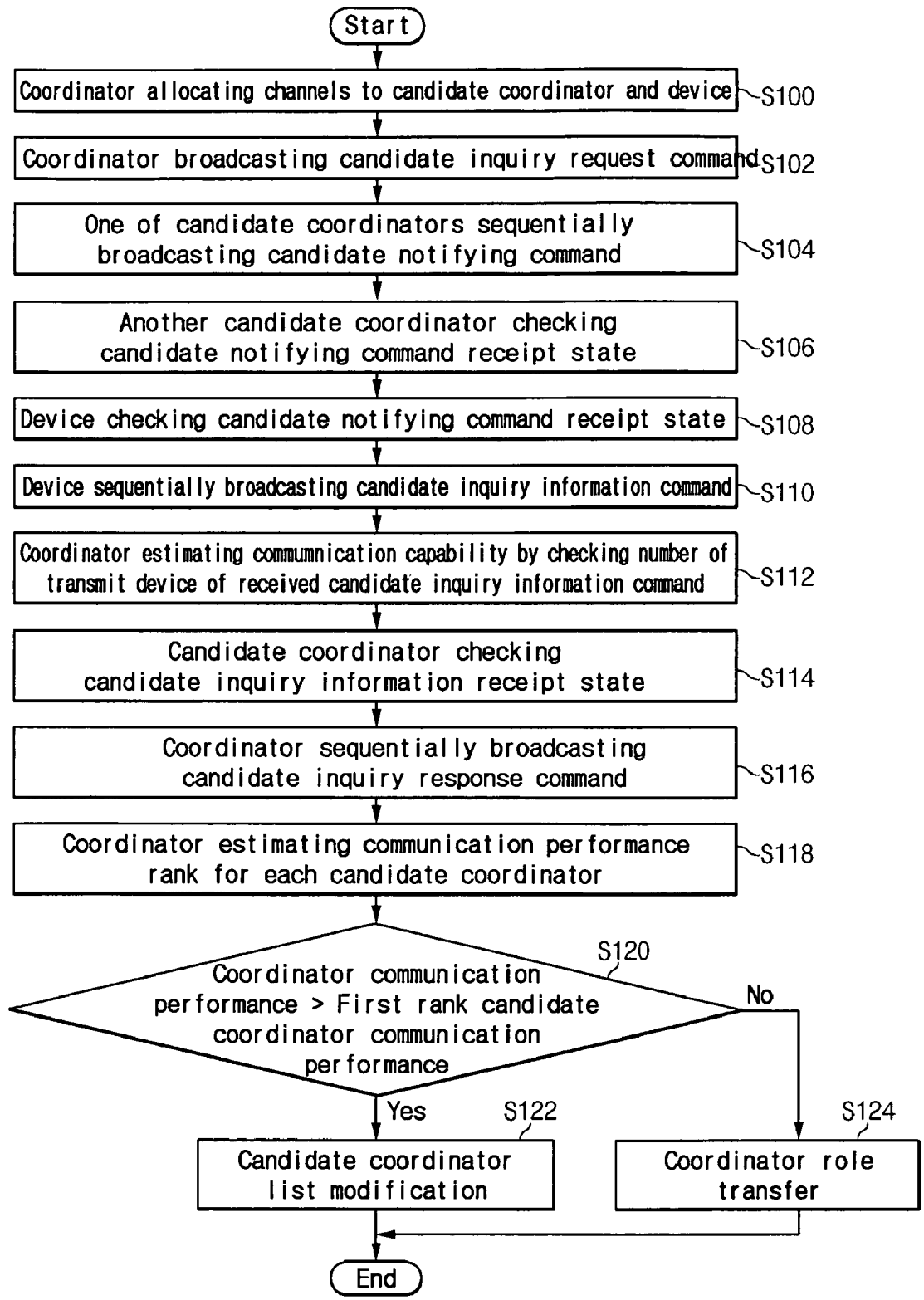
FIG. 2 shows a flow chart for representing a coordinator selection method for a coordinator hand-over in the wireless personal area network shown in FIG. 1.

As shown in FIG. 2, when the coordinator selection process is started, the coordinator 100 transmits a channel time allocation to each device by using a beacon frame. At this time, channels are allocated from the candidate coordinator 300 to the devices 200, and an additional channel for the candidate coordinator 300 is allocated in step of S100.

The coordinator 100 broadcasts the candidate inquiry request command in an allocated time to the coordinator 100 in a channel time allocation period CTAP in step S102. The candidate inquiry request command includes the information on the list of the candidate coordinator 300.

The candidate coordinator 300 sequentially broadcasts a candidate notifying command through the respective channels included in the list and allocated in order to test the communication performance in step S104.

At this time, another candidate coordinator 300 and the device 200 received the candidate notifying command change state field values corresponding to the IDs of transmission candidate coordinators 300 in the respective communication state tables (e.g. inaccessible state: 0 and accessible state: 1, in steps S106 and S108).

The device 200 sequentially broadcasts the respective candidate inquiry information commands in an allocated channel time in step S110. The coordinator 100 that receives the candidate inquiry information command increases the number of accessible devices in the candidate coordinator information table 110 in step S112.

At this time, the candidate inquiry information command includes the list information on the candidate coordinator 300 represented as the accessible state (e.g. 1) in the communication state table 210 of the device 200. The candidate coordinator 300 represented as the accessible state in the communication state table 210 of the device 200 gradually increases the number of the accessible devices in the communication state table 310 of the candidate coordinator 300 when the candidate coordinator 300 receives the candidate inquiry information command in step S114. Accordingly, the communication performance between the candidate coordinator 300 and the device 200 is checked in both directions.

The candidate coordinators 300 broadcast the candidate inquiry response command through the additionally allocated channel in step of S116. At this time, the number of accessible devices and the candidate coordinator 300, and the information on the candidate coordinator 300 and another accessible coordinator 300 are stored in the candidate inquiry response command.

The coordinator 100 receives the candidate inquiry response command and estimates communication performance for the respective candidate coordinators 300. For example, the coordinator 100 estimates the communication performance with reference to the number of the accessible devices for the respective candidate coordinators 300 in step S118.

At this time, a candidate coordinator 300 having the largest number of accessible devices becomes a first rank candidate coordinator. The coordinator compares the number of the accessible devices of the first rank candidate coordinator to that of the coordinator, and the role as a coordinator is transferred when the communication performance of the first rank candidate coordinator is superior to that of the coordinator. At this time, the information on transmission power and the maximum number of manageable devices is considered.

When the communication performance of the coordinator 100 is superior to that of the first rank candidate coordinator, the role as a coordinator is maintained. Instead, the coordinator 100 stores the information on the first rank candidate coordinator, and allows the immediate transfer of the role of a coordinator to the first rank candidate coordinator when it is urgent in step S122. At this time, information on other candidate coordinators 300 is deleted, leaving information on the first rank candidate coordinator.

Figure 3:
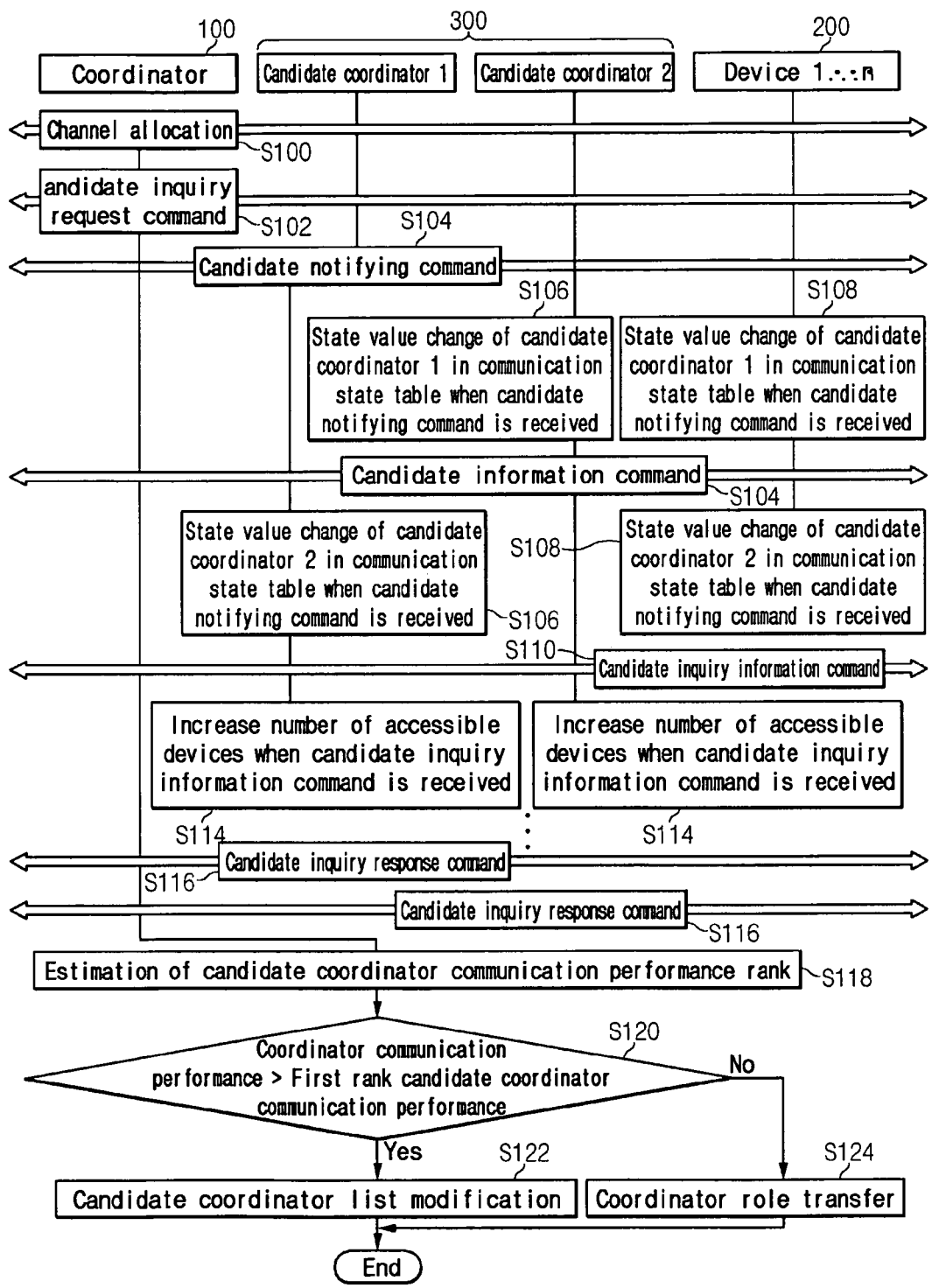
FIG. 3 shows a message flow chart of the coordinator selection method for the coordinator hand-over shown in FIG. 2.

As shown in FIG. 3, when a new device (a candidate coordinator 2) participates in the network, a coordinator selection process for the coordinator 100 hand-over is started.

At this time, the new device (the candidate coordinator 2) is regarded as the candidate coordinator 300 in the like manner of the existing candidate coordinator (the candidate coordinator 1), and the process is started. When a plurality of new devices which are able to perform a role as a coordinator participate in the network, the new devices are regarded as the coordinators 300 and the process is also started.

The coordinator 100 respectively allocates channels to the two candidate coordinators 300 (the candidate coordinator 1 and the candidate coordinator 2) and N numbers of devices 200, and two additional channels for the candidate coordinators 300 (the candidate coordinator 1 and the candidate coordinator 2) are allocated in step o S100.

The coordinator 100 broadcasts the candidate inquiry request command in step S102, and the candidate coordinators 300 (the candidate coordinator 1 and the candidate coordinator 2) broadcast the candidate notifying command through the respectively allocated channels in step S104.

When the candidate coordinator 1 broadcasts the candidate notifying command, the candidate coordinator 2 and the N number of devices 200 change a state field value corresponding to the ID of the candidate coordinator 1 in the respective communication state tables 310 in steps S106 and S108.

In addition, when the candidate coordinator 2 broadcasts the candidate notifying command, the candidate coordinator 2 and the N number of devices 200 change a state field value corresponding to the ID of the candidate coordinator 2 in the respective communication state tables 310 in steps S106 and S108.

The N devices 200 sequentially broadcast the respective candidate inquiry commands for an allocated channel time in step S110. The coordinator 100 that receives the candidate inquiry command increases the number of accessible devices of the coordinator to N number maximum in step S112.

When the candidate coordinator represented as the accessible state in the communication state table 210 of the device 200 receives the candidate inquiry information command, the candidate coordinator increases the number of accessible devices in the communication state table 310 of the candidate coordinator in step S114.

Accordingly, the candidate coordinator 1 and the candidate coordinator 2 respectively have N number of accessible devices when the respective N number of devices 200 receive the two candidate notifying commands respectively broadcasted by the candidate coordinator 1 and the candidate coordinator 2, and the candidate coordinator 1 and the candidate coordinator 2 respectively receive the N number of candidate inquiry information commands broadcasted by the N number of devices 200.

The candidate coordinators 300 (the candidate coordinator 1 and the candidate coordinator 2) sequentially broadcast the candidate inquiry response command through the additionally allocated channels in step of S116.

The coordinator 100 receives the candidate inquiry response command and estimates the communication performance of the candidate coordinator 1 and candidate coordinator 2. At this time, the candidate coordinator 2 becomes the first rank candidate coordinator 300 when the number of accessible devices of the candidate coordinator 2 is greater than that of the candidate coordinator 1 in step S118.

The coordinator 100 transfers the role as a coordinator to the first rank candidate coordinator 300 (the candidate coordinator 2) when the number of the accessible devices of the candidate coordinator 2 is greater than that of the coordinator 100 in steps S120 and S124. At this time, the information on transmission power and the maximum number of manageable devices is considered in order to estimate the performance.

However, the role as the coordinator is maintained when the number of the accessible devices of the first rank candidate coordinator 2 is less than that of the coordinator 100. Instead, the coordinator 100 stores the information on the candidate coordinator 2 as the first rank candidate coordinator 300. At this time, the information on the other candidate coordinator 1 300 is deleted.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

According to the present invention, candidate devices for the coordinator hand-over participate in the communication performance test, and therefore the number of messages for the test is saved. Also, the communication performance between devices is checked in both directions, and therefore the reliability of the candidate coordinator is improved. In addition, the role as a coordinator is immediately transferred when it is urgent because candidates for the coordinator hand-over are preliminarily selected and maintained.

What is claimed is:

1. A method for selecting a coordinator for a coordinator hand-over in a wireless network:
    controlling a coordinator to broadcast a candidate inquiry request command;
    controlling more than one candidate coordinators to receive the candidate inquiry request command, controlling one of the candidate coordinators to sequentially broadcast a candidate notifying command, and controlling other candidate coordinators to check whether the candidate notifying command has been received;
    controlling a device to check whether the candidate notifying command has been received from the broadcasting candidate coordinator, and to sequentially broadcast a candidate inquiry information command;
    controlling the candidate coordinator to check whether the candidate inquiry information command has been received from the device having received the candidate notifying command broadcasted by the candidate coordinator, and to sequentially broadcast a candidate inquiry response command including the number of accessible devices and the candidate notifying command receipt information; and
    controlling the coordinator to receive the candidate inquiry response command and estimate communication performance ranks for the respective candidate coordinators,
    controlling the coordinator to check the number of transmission devices of the received candidate inquiry information command, thereby estimating the communication performance of the coordinators: and
    controlling the coordinator to transfer a role as a coordinator to a first rank candidate coordinator when the communication performance of the first rank candidate coordinator is, superior to that of the coordinator.

2. The method of claim 1, further comprising storing the first rank candidate coordinator as a candidate coordinator when the communication performance of the coordinator is superior to that of the first rank candidate coordinator.

3. The method of claim 1, further comprising:
    controlling the device to sequentially broadcast the candidate inquiry information command, and controlling the coordinator to check the number of transmission devices of the received candidate inquiry information command and estimate the communication performance; and
    controlling the coordinator to estimate the communication performance ranks for the respective candidate coordinators, and store the first rank candidate coordinator as a candidate coordinator when the communication performance of the coordinator is superior to that of the first rank candidate coordinator.

4. The method of claim 1, wherein the communication performance estimation for the respective candidate coordinators depends on the checked number of accessible devices.

5. a wireless network including a coordinator, comprising more than one candidate and more than one device, wherein:
    the coordinator comprises a candidate coordinator list, and broadcasts a candidate inquiry request command information; and
    the candidate coordinator receives the candidate inquiry request command and sequentially broadcasts a candidate notifying command, and other candidate coordinators check whether the candidate notifying command has been received from the broadcasting candidate coordinator;
    the device checks whether tile candidate notifying command has been received and sequentially broadcasts a candidate inquiry information command;
    the candidate coordinator checks whether the candidate inquiry information command has been received from the device having received the candidate notifying command broadcasted by the candidate coordinator, and sequentially broadcasts a candidate inquiry response command having the number of accessible devices and the candidate notifying command receipt information; and the coordinator checks the number of transmission devices of the received candidate inquiry information command, estimates the communication performance of the coordinator, receives the candidate inquiry response command, estimates the communication performance ranks for the respective candidate coordinators, and transfers a role as a coordinator to a first rank candidate coordinator when the communication performance of the first rank candidate coordinator is superior to that of the coordinator.

6. The wireless personal area network of claim 5, wherein the coordinator receives the candidate inquiry response command, and estimates communication performance ranks for the respective candidate coordinators.

7. The wireless personal area network of claim 6, wherein the communication performance estimation for the respective candidate coordinators depends on the number of the checked accessible devices.

8. The wireless personal area network of claim 5, wherein the coordinator receives the candidate inquiry response command, estimates the communication performance ranks for the respective candidate coordinators, and stores the first candidate coordinator as a candidate coordinator when the communication performance of the coordinator is superior to that of the first candidate coordinator.

9. The wireless personal area network of claim 8, wherein the communication performance estimation for the respective candidate coordinators depends on the number of the checked accessible devices.

10. The wireless personal area network of claim 5, wherein the communication performance estimation for the respective candidate coordinators depends on the number of the checked accessible devices.

* * * * *